under 35 U.S.C. 154(b) by 31 days.

(12) United States Patent
Zhang et al.

(10) Patent No.: US 9,535,952 B2
(45) Date of Patent: Jan. 3, 2017

(54) DYNAMIC SELECTION OF OPTIMAL GROUPING SEQUENCE AT RUNTIME FOR GROUPING SETS, ROLLUP AND CUBE OPERATIONS IN SQL QUERY PROCESSING

(75) Inventors: Guogen Zhang, San Jose, CA (US);
Fen-Ling Lin, San Jose, CA (US);
Jung-Hsin Hu, Saratoga, CA (US);
Yao-Ching S. Chen, Saratoga, CA (US); Yun Wang, Saratoga, CA (US);
Glenn M. Yuki, Los Gatos, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 31 days.

(21) Appl. No.: 13/443,997

(22) Filed: Apr. 11, 2012

(65) Prior Publication Data
US 2012/0226693 A1    Sep. 6, 2012

Related U.S. Application Data

(63) Continuation of application No. 10/629,459, filed on Jul. 29, 2003, now abandoned.

(51) Int. Cl.
*G06F 17/30*    (2006.01)
(52) U.S. Cl.
CPC ............................. *G06F 17/30454* (2013.01)
(58) Field of Classification Search
None
See application file for complete search history.

(56) References Cited

U.S. PATENT DOCUMENTS

| | | | |
|---|---|---|---|
| 5,598,559 A | | 1/1997 | Chaudhuri |
| 5,832,475 A | * | 11/1998 | Agrawal et al. |
| 5,963,936 A | * | 10/1999 | Cochrane et al. |
| 6,438,741 B1 | | 8/2002 | Al-omari et al. |
| 6,507,835 B1 | * | 1/2003 | Amundsen et al. |
| 6,560,594 B2 | * | 5/2003 | Cochrane et al. |
| 6,574,623 B1 | | 6/2003 | Leung et al. |
| 6,691,101 B2 | | 2/2004 | MacNicol et al. |
| 6,694,322 B2 | * | 2/2004 | Warren et al. |
| 6,775,681 B1 | * | 8/2004 | Ballamkonda et al. ...... 707/718 |

(Continued)

OTHER PUBLICATIONS

Cheng, et al. "Implementation of Two Semantic Query Optimization Techniques in DB2 Universal Database", 1999, Morgan Kaufmann Publishers, Inc., Proceedings of the 25th International Conference on Very Large Data Bases, pp. 687-698.

*Primary Examiner* — Charles Adams
(74) *Attorney, Agent, or Firm* — Gates & Cooper LLP

(57) ABSTRACT

A method, apparatus, and article of manufacture for optimizing a query in a computer system. Grouping operations are optimized during execution of the query in the computer system by: (1) translating the grouping operations into a plurality of levels, wherein each of the levels is comprised of one or more grouping sets with the same number of grouping expressions; (2) deriving the grouping sets on a level-by-level basis, wherein the grouping sets in a base level are obtained from the database and the grouping sets in a next one of the levels are derived by selecting as an input a smallest one of the grouping sets in a previous one of the levels with which it has a derivation relationship; and (3) combining the derived grouping sets into an output for the query.

21 Claims, 6 Drawing Sheets

(56) References Cited

U.S. PATENT DOCUMENTS

| | | | |
|---|---|---|---|
| 7,010,524 | B2 | 3/2006 | Galindo-Legaria et al. |
| 7,133,865 | B1 * | 11/2006 | Pedersen et al. |
| 2002/0138460 | A1 | 9/2002 | Cochrane et al. |

* cited by examiner

DYNAMIC SELECTION OF OPTIMAL GROUPING SEQUENCE AT RUNTIME FOR GROUPING SETS, ROLLUP AND CUBE OPERATIONS IN SQL QUERY PROCESSING

CROSS-REFERENCE TO RELATED APPLICATION

This application is continuation under 35 U.S.C. §120 of U.S. patent application Ser. No. 10/629,459, filed on Jul. 29, 2003, now abandoned by Guogen Zhang, Fen-Ling Lin, Jung-Hsin Hu, Yao-Ching S. Chen, Yun Wang, and Glenn M. Yuki, entitled "DYNAMIC SELECTION OF OPTIMAL GROUPING SEQUENCE AT RUNTIME FOR GROUPING SETS, ROLLUP AND CUBE OPERATIONS IN SQL QUERY PROCESSING," now abandoned, which application is incorporated by reference herein.

BACKGROUND OF THE INVENTION

1. Field of the Invention

This invention relates in general to database management systems performed by computers, and in particular, to the optimization of queries by dynamic selection of optimal grouping sequence at runtime for grouping sets, rollup and cube operations in SQL query processing.

2. Description of Related Art

Computer systems incorporating Relational DataBase Management System (RDBMS) software using the Structured Query Language (SQL) interface are well known in the art. SQL has evolved into a standard language for RDBMS software and has been adopted as such by both the American Nationals Standard Institute (ANSI) and the International Standards Organization (ISO).

To better support business intelligence (BI) and online analytic processing (OLAP) applications, a set of grouping operations, in addition to the standard GROUP BY clause, have recently been included into SQL, to allow users to create various groupings of data in a single SQL query. The set of grouping operations include GROUPING SETS, ROLLUP, CUBE and a scalar GROUPING function.

The GROUP BY clause specifies how the set of rows is to be sub-divided or grouped. Rows with the same values for the expressions in the group by clause are grouped together. GROUPING SETS allows the user to specify several groupings of data are to be calculated, including a "subtotal" row. ROLLUP and CUBE are special cases of the generic GROUPING SETS operation, which can be thought of as "super group" operations because they provide many groupings in a single statement. In addition, a new scalar function, GROUPING, is provided to work in conjunction with these extensions.

What is a needed in the art are techniques that optimize the execution of queries containing a GROUP BY clause with one or more GROUPING SETS, ROLLUP and CUBE operations with or without scalar GROUPING functions. Specifically, there is a need in the art for techniques that avoid unnecessary steps in the execution of such queries. The present invention satisfies these needs.

SUMMARY OF THE INVENTION

To overcome the limitations in the prior art described above, and to overcome other limitations that will become apparent upon reading and understanding the present specification, the present invention discloses a method, apparatus, and article of manufacture for optimizing a query in a computer system, wherein the query is performed by the computer system to retrieve data from a database stored on the computer system. During compilation of the query, a GROUP BY clause with one or more GROUPING SETS, ROLLUP or CUBE operations is maintained in its original form until after query rewrite. The GROUP BY clause with the GROUPING SETS, ROLLUP or CUBE operations is then translated into a plurality of levels having one or more grouping sets. After compilation of the query, a grouping sets sequence is dynamically determined for the GROUP BY clause with the GROUPING SETS, ROLLUP or CUBE operations based on intermediate grouping sets, in order to optimize the grouping sets sequence. The execution of the grouping sets sequence is optimized by selecting a smallest grouping set from a previous one of the levels as an input to a grouping set on a next one of the levels. Finally, a UNION ALL operation is performed on the grouping sets.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural and functional changes may be made without departing from the scope of the present invention.

Overview

The present invention dynamically determines a grouping sequence based on intermediate results sets, in order to choose an optimal grouping order. During compilation of a query, a GROUP BY clause with one or more GROUPING SETS, ROLLUP or CUBE operations is maintained in its original form until after query rewrite. The GROUP BY clause with the GROUPING SETS, ROLLUP or CUBE operations is then translated into a plurality of levels having one or more grouping sets. After compilation of the query, a grouping sets sequence is dynamically determined for the GROUP BY clause with the GROUPING SETS, ROLLUP or CUBE operations based on intermediate grouping sets, in order to optimize the grouping sets sequence. The execution of the grouping sets sequence is optimized by selecting a smallest grouping set from a previous one of the levels as an input to a grouping set on a next one of the levels. Finally, a UNION ALL operation is performed on the grouping sets. In this manner, runtime execution is optimized by choosing a best processing order dynamically to minimize execution time.

Hardware and Software Environment

Figure 1:
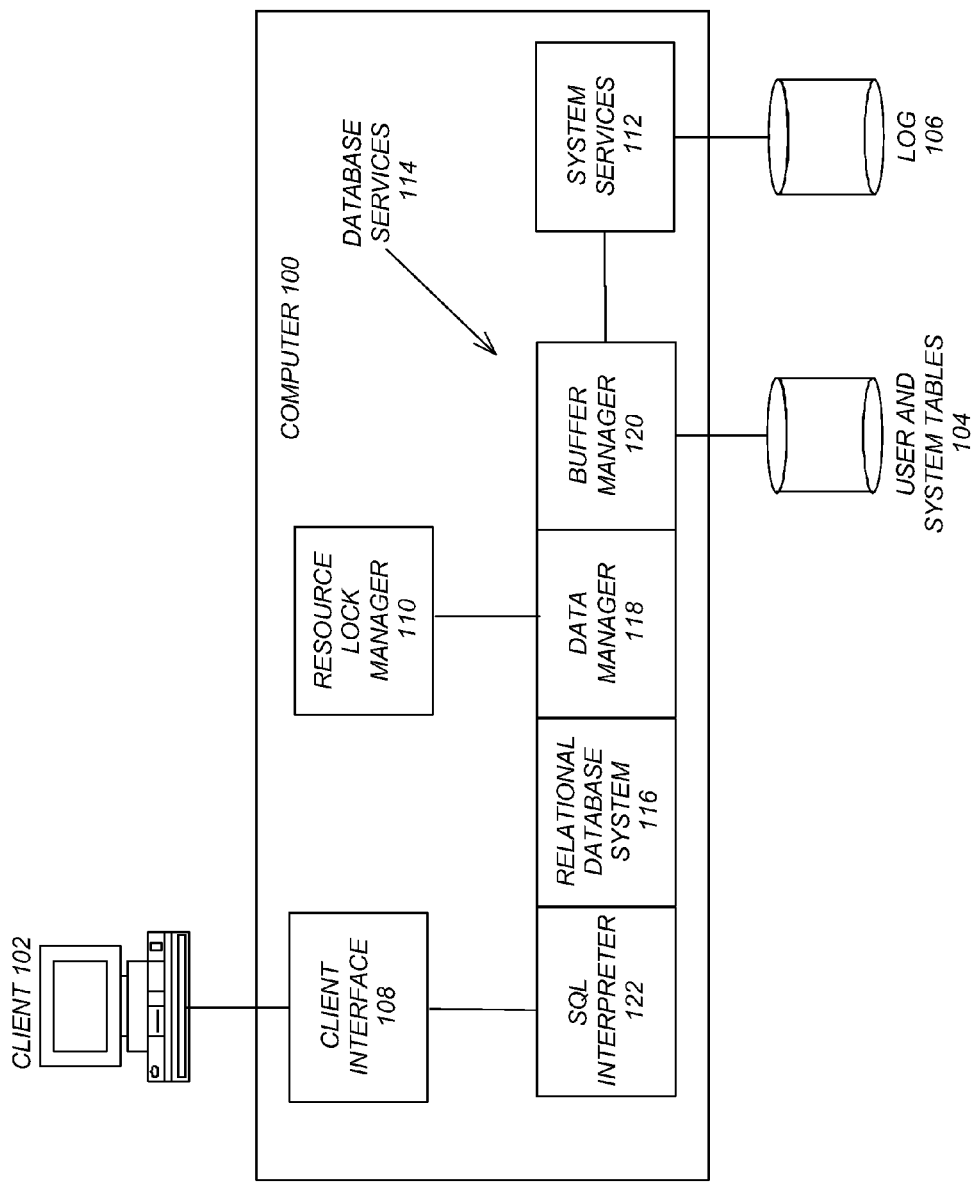
FIG. 1 illustrates an exemplary computer hardware and software environment that could be used with an embodiment of the present invention.

FIG. 1 illustrates an exemplary computer hardware and software environment that could be used with the present invention. In the exemplary environment, a server system 100 is connected to one or more client systems 102, in order to manage one or more databases 104 and 106 shared among the client systems 102.

Operators of the client systems 102 use a standard operator interface 108 to transmit commands to and from the server system 100 that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2 product offered by IBM for the MVS, LINUX, UNIX, WINDOWS or OS/2 operating systems. Those skilled in the art will recognize, however, that the present invention has application to any RDBMS software.

As illustrated in FIG. 1, the RDBMS includes three major components: the Resource Lock Manager (RLM) 110, the Systems Services module 112, and the Database Services module 114. The RLM 110 handles locking services, because the RDBMS treats data as a shared resource, thereby allowing any number of users to access the same data simultaneously, and thus concurrency control is required to isolate users and to maintain data integrity. The Systems Services module 112 controls the overall RDBMS execution environment, including managing log data sets 106, gathering statistics, handling startup and shutdown, and providing management support.

At the heart of the RDBMS architecture is the Database Services module 114. The Database Services module 114 contains several submodules, including a Relational Database System (RDS) 116, Data Manager 118, Buffer Manager 120, and SQL Interpreter 122. These submodules support the functions of the SQL language, i.e., definition, access control, retrieval, and update of user and system data.

Generally, each of the components, modules, and submodules of the RDBMS comprise instructions and/or data, and are embodied in or retrievable from a computer-readable device, medium, or carrier, e.g., a memory, a data storage device, a remote device coupled to the server computer 100 by a data communications device, etc. Moreover, these instructions and/or data, when read, executed, and/or interpreted by the server computer 100, cause the server computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", or alternatively, "computer program carrier", as used herein is intended to encompass a computer program accessible from any computer-readable device, carrier, or media.

Of course, those skilled in the art will recognize many modifications may be made to this configuration without departing from the scope of the present invention. Specifically, those skilled in the art will recognize that any combination of the above components, or any number of different components, including computer programs, peripherals, and other devices, may be used to implement the present invention, so long as similar functions are performed thereby.

Interactive SQL Execution

Figure 2:
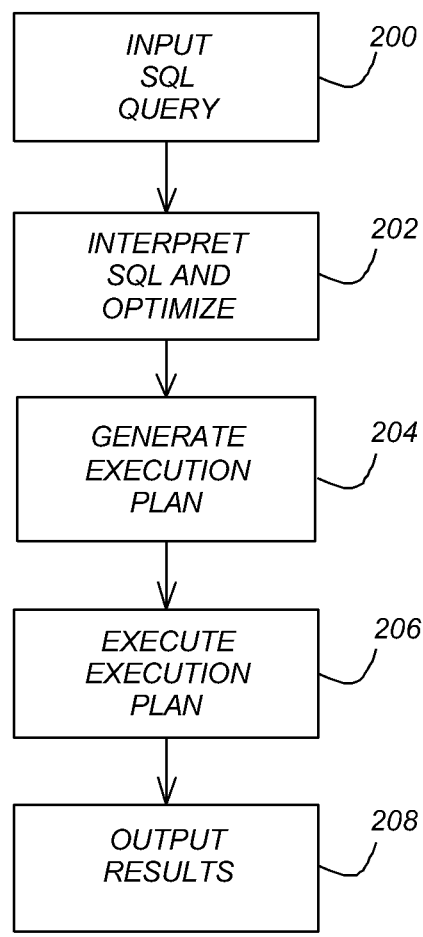
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the present invention. Block 200 represents the input of SQL statements into the server system 100. Block 202 represents the step of compiling or interpreting the SQL statements. An optimization function within block 202 may transform or optimize the SQL query in a manner described in more detail later in this specification. Generally, the SQL statements received as input specify only the desired data, but not how to retrieve the data. This step considers both the available access paths (indexes, sequential reads, etc.) and system held statistics on the data to be accessed (the size of the table, the number of distinct values in a particular column, etc.), to choose what it considers to be the most efficient access path for the query. Block 204 represents the step of generating a compiled set of runtime structures called a query execution plan from the compiled SQL statements. Block 206 represents the execution of the query execution plan and Block 208 represents the output of the results.

Embedded/Batch SQL Execution

Figure 3:
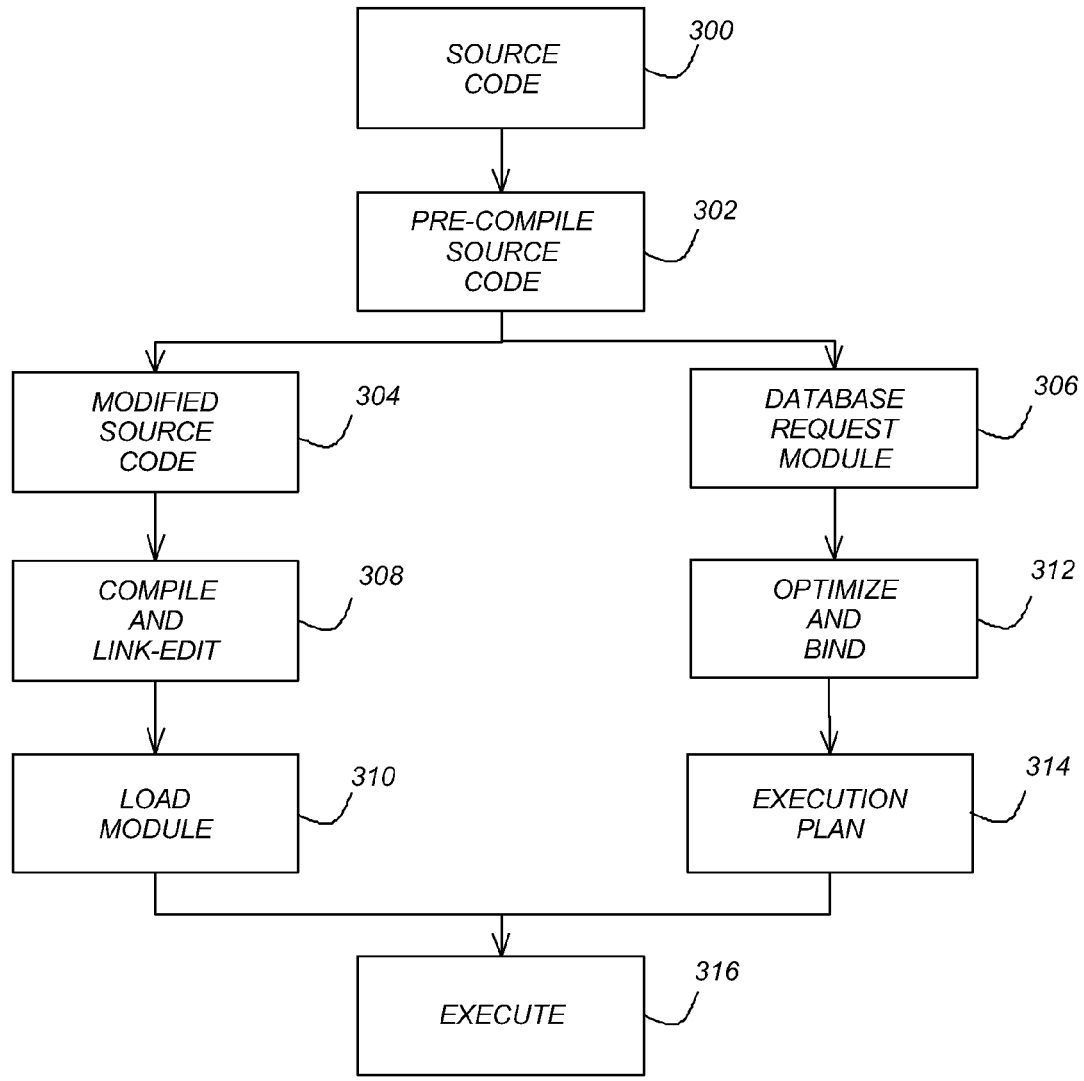
FIG. 3 is a flowchart illustrating the steps necessary for the interpretation and execution of SQL statements embedded in source code according to the present invention.

FIG. 3 is a flowchart illustrating the steps necessary for the interpretation and execution of SQL statements embedded in host language source code according to the present invention. Block 300 represents program source code containing a host language (such as COBOL or C) and embedded SQL statements. The program source code is then input to a pre-compile step 302. There are two outputs from the pre-compile step 302: a modified source module 304 and a Database Request Module (DBRM) 306. The modified source module 304 contains host language calls to DB2, which the pre-compile step 302 inserts in place of SQL statements. The DBRM 306 is comprised of the SQL statements from the program source code 300. A compile and link-edit step 308 uses the modified source module 304 to produce a load module 310, while an optimize and bind step 312 uses the DBRM 306 to produce a compiled set of runtime structures for the query execution plan 314. As indicated above in conjunction with FIG. 2, the SQL statements from the program source code 300 specify only the desired data, but not how to retrieve the data. The optimize and bind step 312 may optimize the SQL query in a manner described in more detail later in this specification. Thereafter, the optimize and bind step 312 considers both the available access paths (indexes, sequential reads, etc.) and system held statistics on the data to be accessed (the size of the table, the number of distinct values in a particular column, etc.), to choose what it considers to be the most efficient access path for the query. The load module 310 and query execution plan 314 are then executed together at step 316.

Description of the Optimization Technique

The present invention discloses an improved optimization technique that is typically performed at steps 204 and 206 of FIG. 2 or steps 312 and 316 of FIG. 3. Specifically, the present invention optimizes the execution of grouping operations, including GROUPING SETS, ROLLUP or CUBE operations, used in conjunction with GROUP BY clauses in SQL queries executed by the RDBMS.

The GROUPING SETS operation allows the user to specify several groupings of data are to be calculated, including a "subtotal" row.

The ROLLUP and CUBE operations are special cases of the generic GROUPING SETS operation. They can be thought of as "super group" operations because they provide many groupings in a single statement. "Sub-total" rows are often used to describe the additional rows provided by ROLLUP and CUBE because the SUM function is commonly used for aggregation. However, other aggregate functions, such as the AVG function, can be used instead. To evaluate other aggregate functions that cannot be computed directly from the same functions with a different grouping, such as AVG, VAR, and STDDEV, they have to be converted into a formula of SUM and COUNT. SUM and COUNT can be computed from a lower level grouping. Only SUM and COUNT values are kept in intermediate results. The following discussion assumes that this transformation is done for grouping set computation.

In addition, a scalar GROUPING function is provided to work in conjunction with the GROUPING SETS, ROLLUP or CUBE operations.

The following provides a more detailed description of the GROUP BY clause, the GROUPING SETS, ROLLUP, and CUBE operations, and the scalar GROUPING function.

GROUP BY Clause

The GROUP BY clause specifies how the set of rows is to be sub-divided or grouped. Rows with the same values for the expressions in the GROUP BY clause are grouped together.

GROUPING SETS Operation

The GROUPING SETS operation provides the ability to specify multiple grouping criteria within a single statement. A GROUPING SETS operation can be a simple grouping, or a "super group", or a combination of the two. Since each GROUPING SETS operation produces a set of rows, the result of the GROUPING SETS operation is equivalent to a UNION ALL of the sets of rows. For each GROUPING SETS operation, the data for input columns (or expressions) is aggregated and returned. Data for non-aggregated columns that do not appear in the grouping clause are "collapsed," meaning a NULL value is returned for each such column. Aggregated columns in the select list are considered to be part of each grouping.

The following example illustrates the use of the GROUPING SETS operation. Suppose Joe Stevens owns three car dealerships, one for Audis, one for BMWs, and one for Porsches. Joe runs a query to find out what the inventories were for each dealership at the end of the third quarter and at the end of the seventh and eighth months of the quarter. (Assume the base table contains the appropriate data to allow the query to run.)

Query:

SELECT quarter(sales_date) as qtr,
month(sales_date) as month, dealership as dealer,
sum(sales) as units_sold
FROM car_sales
WHERE quarter(sales_date) = 3
GROUP BY GROUPING SETS((quarter(sales_date)),
(month(sales_date)),
(dealership))
ORDER BY qtr, month, dealer;

The results are:

| QTR | MONTH | DEALER | UNITS_SOLD |
| --- | --- | --- | --- |
| 3 | — | — | 730 |
| — | 7 | — | 270 |
| — | 8 | — | 460 |
| — | — | AUDI | 320 |
| — | — | BMW | 330 |
| — | — | PORSCHE | 80 |

The first line is produced by the GROUPING SET(quarter (sales_date)). The second and third lines are produced by the GROUPING SET(month(sales_date)). The remaining lines are produced by the GROUPING SET(dealership). Note that some values are shown as NULL (indicated by a dash). There is a way to tell when the NULL values are being returned as a result of the GROUPING SET. This is explained in the scalar GROUPING function below.

Scalar GROUPING Function

The scalar GROUPING function can be used in a select list; it works in conjunction with a GROUPING SETS operation. The scalar GROUPING function enables the user to determine whether a column (or expression) returned as NULL is because its value really is NULL or, alternatively, because the column (or expression) has been "collapsed" in the returned row because it is not part of a GROUPING SETS operation. In the latter case, the grouping value is set to 1; if a column (or expression) value is actually NULL, the grouping value is set to 0.

The following example illustrates the use of GROUPING SETS and scalar GROUPING function together.

Query:

SELECT quarter(sales_date) as qtr,
month(sales_date) as month, dealership as dealer,
sum(sales) as sold,
GROUPING(quarter(sales_date)) as qtr_grp,
GROUPING(month(sales_date)) as mo_grp,
GROUPING(dealership) as dlr_grp
FROM car_sales
WHERE quarter(sales_date) = 3
GROUP BY GROUPING SETS((quarter(sales_date)),
(month(sales_date)),
(dealership) )
ORDER BY qtr, month, dealer;

The results are:

| QTR | MONTH | DEALER | SOLD | QTR_GRP | MO_GRP | DLR_GRP |
|---|---|---|---|---|---|---|
| 3 | — | — | 730 | 0 | 1 | 1 |
| — | 7 | — | 270 | 1 | 0 | 1 |
| — | 8 | — | 460 | 1 | 0 | 1 |
| — | — | AUDI | 320 | 1 | 1 | 0 |
| — | — | BMW | 330 | 1 | 1 | 0 |
| — | — | PORSCHE | 80 | 1 | 1 | 0 |

The 1's in the QTR_GRP, MO_GRP and DLR_GRP columns indicate the corresponding values in the QTR, MONTH, and DEALER columns have been collapsed; they are not actually NULL. The 0's in the QTR_GRP, MO_GRP and DLR_GRP columns indicate the corresponding values in the QTR, MONTH, and DEALER columns are actual values. For example, the 1's in the MO_GRP and DEAL_GRP columns for the first row indicate that the MONTH and DEALER column values have been collapsed, whereas the 0 in the QTR_GRP column indicates the QTR column contains an actual value.

ROLLUP Operation

A ROLLUP operation is an extension to the GROUP BY clause that provides sub-total rows in addition to the rows that would normally be produced. A sub-total row is one that contains further aggregate values that are calculated using the same column function as the one specified in the sub-query used to obtain the groups of rows.

A ROLLUP operation is equivalent to a form of GROUPING SETS operation. A ROLLUP operation of "n" grouping expressions results in "n+1" GROUPING SETS operations. For example, the following:

GROUP BY ROLLUP ($C_1, C_2, \ldots, C_n$)

is equivalent to:

GROUP BY GROUPING SETS(($C_1$),
($C_1, C_2$),
...,
($C_1, C_2, \ldots, C_{n-1}$),
($C_1, C_2, \ldots, C_{n-1}, C_n$),
( ))

The order of grouping expressions in a ROLLUP operation is significant; they are not commutative. For example, the following:

GROUP BY ROLLUP (C1, C2, C3)

results in:

GROUP BY GROUPING SETS((C1, C2, C3),
(C1, C2),
(C1)
( ) )

whereas, the following:

GROUP BY ROLLUP (C3, C2, C1)

results in:

GROUP BY GROUPING SETS((C3, C2, C1),
(C3, C2),
(C3),
( ))

The following example illustrates the use of a GROUP BY clause with a ROLLUP operation:

Query:

SELECT quarter(sales_date) as qtr,
month(sales_date) as month, dealership as dealer,
sum(sales) as sold,
GROUPING(quarter(sales_date)) as qtr_grp,
GROUPING(month(sales_date)) as mo_grp,
GROUPING(dealership) as dlr_grp
FROM car_sales
WHERE quarter(sales_date) = 3
GROUP BY ROLLUP( (quarter(sales_date)), (month(sales_date)), (dealership) )
ORDER BY qtr, month, dealer;

The results are:

| QTR | MONTH | DEALER | SOLD | QTR_GRP | MO_GRP | DLR_GRP |
|---|---|---|---|---|---|---|
| 3 | 7 | AUDI | 110 | 0 | 0 | 0 |
| 3 | 7 | BMW | 120 | 0 | 0 | 0 |
| 3 | 7 | PORSCHE | 40 | 0 | 0 | 0 |
| 3 | 7 | — | 270 | 0 | 0 | 1 |
| 3 | 8 | AUDI | 210 | 0 | 0 | 0 |
| 3 | 8 | BMW | 210 | 0 | 0 | 0 |
| 3 | 8 | PORSCHE | 40 | 0 | 0 | 0 |
| 3 | 8 | — | 460 | 0 | 0 | 1 |
| 3 | — | — | 730 | 0 | 1 | 1 |
| — | — | — | 730 | 1 | 1 | 1 |

Note the results are different from the previous query example for the GROUPING function. The major difference is that sub-total rows are produced. The first sub-total row (line 4) gives the sum of the SOLD values for rows where QTR=3 and MONTH=7 with DEALER values collapsed. The second sub-total row (line 8) gives the sum of the SOLD values for rows where QTR=3 and MONTH=8 with DEALER values collapsed. The third sub-total row (line 9) gives the sum of the SOLD values for rows where QTR=3 with MONTH and DEALER values collapsed. The final grand total row (line 10) gives the sum of the SOLD values with QTR, MONTH, and DEALER values collapsed. As mentioned before, sub-total or grand total row can be recognized by the fact that QTR_GRP, MO_GRP, and DLR_GRP contain a 1 when a NULL value appears in the corresponding QTR, MONTH, or DEALER column.

CUBE Operation

A CUBE operation is another extension to the GROUP BY clause that provides "cross tabulation" rows in addition to all of the rows produced by a ROLLUP operation. Cross tabulation rows are produced by processing additional combinations of the grouping expressions specified as part of the subquery.

A CUBE operation grouping is like a ROLLUP operation grouping in that it can be expressed as a form of GROUPING SETS operation. For a CUBE operation, all combinations of the CUBE grouping expressions are computed in addition to a grand total row. A CUBE operation of "n" grouping expressions results in $2^n$ GROUPING SETS operation. For example, the following:

GROUP BY CUBE (C1, C2, C3)

produces:

```
GROUP BY GROUPING SETS((C1, C2, C3),
                      (C1, C2),
                      (C1, C3),
                      (C2, C3),
                      (C1),
                      (C2),
                      (C3),
                      ( ))
```

The order of grouping expressions in a CUBE operation is not significant. Two queries with identical grouping expressions in different orders will produce the same rows, but in a different order. The ORDER BY clause can be used to specify the row order.

The following example illustrates the use of GROUP BY clause with a CUBE operation.

Query:

```
SELECT quarter(sales_date) as qtr,
       month(sales_date) as month, dealership as dealer,
       sum(sales) as units_sold,
       GROUPING(quarter(sales_date)) as qtr_grp,
       GROUPING(month(sales_date)) as mo_grp,
       GROUPING(dealership) as dlr_grp
FROM car_sales
WHERE quarter(sales_date) = 3
GROUP BY CUBE( (quarter(sales_date)), (month(sales_date)),
       (dealership) )
ORDER BY qtr, month, dealer;
```

The results are:

Part 1 of 2:

| QTR | MONTH | DEALER | SOLD | QTR_GRP | MO_GRP | DLR_GRP |
|---|---|---|---|---|---|---|
| 3 | 7 | AUDI | 110 | 0 | 0 | 0 |
| 3 | 7 | BMW | 120 | 0 | 0 | 0 |
| 3 | 7 | PORSCHE | 40 | 0 | 0 | 0 |
| 3 | 7 | — | 270 | 0 | 0 | 1 |
| 3 | 8 | AUDI | 210 | 0 | 0 | 0 |
| 3 | 8 | BMW | 210 | 0 | 0 | 0 |
| 3 | 8 | PORSCHE | 40 | 0 | 0 | 0 |
| 3 | 8 | — | 460 | 0 | 0 | 1 |
| 3 | — | AUDI | 320 | 0 | 1 | 0 |
| 3 | — | BMW | 330 | 0 | 1 | 0 |
| 3 | — | PORSCHE | 80 | 0 | 1 | 0 |
| 3 | — | — | 730 | 0 | 1 | 1 |

Part 2 of 2:

| QTR | MONTH | DEALER | SOLD | QTR_GRP | MO_GRP | DLR_GRP |
|---|---|---|---|---|---|---|
| — | 7 | AUDI | 110 | 1 | 0 | 0 |
| — | 7 | BMW | 120 | 1 | 0 | 0 |
| — | 7 | PORSCHE | 40 | 1 | 0 | 0 |
| — | 7 | — | 270 | 1 | 0 | 1 |
| — | 8 | AUDI | 210 | 1 | 0 | 0 |
| — | 8 | BMW | 210 | 1 | 0 | 0 |
| — | 8 | PORSCHE | 40 | 1 | 0 | 0 |
| — | 8 | — | 460 | 1 | 0 | 1 |
| — | — | AUDI | 320 | 1 | 1 | 0 |
| — | — | BMW | 330 | 1 | 1 | 0 |
| — | — | PORSCHE | 80 | 1 | 1 | 0 |
| — | — | — | 730 | 1 | 1 | 1 |

The result set returned by a CUBE operation is similar to and more than what is returned by a ROLLUP operation. A sub-total row can be recognized by the fact that QTR_GRP, MO_GRP, and DLR_GRP contain a 1 when a NULL value appears in the corresponding QTR, MONTH, or DEALER column.

Relationships Between Operations

In some cases, there is a simple relationship among CUBE, ROLLUP, and GROUPING SETS operations. For example, the following:
  GROUP BY CUBE (C1, C2, C3)
produces the same set of rows as:
  GROUP BY ROLLUP(C1), ROLLUP(C2), ROLLUP (C3)
which produces the same set of rows as:

```
GROUP BY GROUPING SETS((C1, C2, C3),
                       (C1, C2),
                       (C1, C3),
                       (C1),
                       (C2, C3),
                       (C2),
                       (C3),
                       ( )).
```

However, this relationship is not true for a slightly more complicated example:
  GROUP BY CUBE (c1, (c2, c3), c4)
does not produce the same result as:
  GROUP BY ROLLUP (c1), ROLLUP(c2, c3), ROLLUP (c4).
The CUBE operation produces 8 grouping sets while the ROLLUP operation produces 12.

For a single GROUP BY clause, various combinations of GROUPING SETS, ROLLUP, and CUBE operations can be specified. When two or more of these sets are specified, they are, in effect, "multiplied" together.

For example, the following:
  GROUP BY ROLLUP(a,b), ROLLUP(c,d)
produces results equivalent to:

```
GROUP BY GROUPING SETS((a,b,c,d),
                       (a,b,c),
                       (a,c,d),
                       (a,c),
                       (a,b),
                       (c,d),
                       (a),
                       (c),
                       ( ) )
```

This can be thought of as multiplying (a,b), (a), ( ) the grouping sets for ROLLUP(a,b), times (c,d), (c), ( ) the grouping sets for ROLLUP(c,d).

In another example, the following:
  GROUP BY CUBE(a,b), CUBE(c,d)
produces results equivalent to:

```
GROUP BY GROUPING SETS((a,b,c,d),
                       (a,b,c),
                       (a,b,d),
                       (a,b),
                       (a,c,d),
                       (a,c),
                       (a,d),
                       (a),
                       (b,c,d),
                       (b,c),
                       (b,d),
                       (b),
                       (c,d),
                       (c),
                       (d),
                       ( ) ).
```

This can be thought of as multiplying (a,b), (a), (b), ( ) the grouping sets for CUBE(a,b), times (c,d), (c), (d), ( ) the grouping sets for CUBE(c,d).

In yet another example, the following:
  GROUP BY ROLLUP(a,b,c), CUBE(d,e)
produces results equivalent to:

```
GROUP BY GROUPING SETS((a,b,c,d,e),
                       (a,b,c,d),
                       (a,b,c,e),
                       (a,b,c),
                       (a,b,d,e),
                       (a,b,d),
                       (a,b,e),
                       (a,b),
                       (a,d,e),
                       (a,d),
                       (a,e),
                       (a),
                       (d,e),
                       (d),
                       (e),
                       ( )).
```

This can be thought of as multiplying (a,b,c), (a,b), (a), ( ), the grouping sets for ROLLUP(a,b,c), times (d,e), (d), (e), ( ), the grouping sets for CUBE(c,d).

The result of a grouping set that is comprised of a subset of grouping expressions of another grouping set can be computed using GROUP BY from the result of the other grouping set. For example, the grouping set (a, d) can be computed or derived from the grouping set (a, b, d), or the grouping set (a, b, c, d), or the grouping set (a, b, c, d, e), by applying GROUP BY a, d.

Optimization of GROUP BY Clauses, GROUPING SETS, ROLLUP and CUBE Operations, and Scalar GROUPING Functions The following describes the optimization of GROUP BY clauses, GROUPING SETS, ROLLUP and CUBE operations, and scalar GROUPING functions according to a preferred embodiment of the present invention.

For example, given a GROUP BY clause with ROLLUP (l,f,g), CUBE(m,s,c) operations, the following steps are performed by the RDBMS:

1. Translating the GROUP BY clause with ROLLUP and CUBE operations into grouping sets. For the above GROUP BY clause, there are 32 grouping sets in 7 levels, where each level contains grouping sets with the same number of grouping expressions:

level 6 $(l, f, g, m, s, c)$ level 5 $(l, f, g, m, s), (l, f, g, m, c), (l, f, g, s, c), (l, f, m, s, c), \ldots$ level 4 $(l, f, m, s), (l, f, m, c), (l, f, s, c), (l, m, s, c), \ldots$ $\ldots$ level 1 $(l), (m), (s), (c)$ level0 $()$ 2. Building result of each next level grouping set by selecting a smallest grouping set from a previous level as its input.

3. Performing a UNION ALL operation on the result of the grouping sets.

The present invention has a number of advantages:

(1) The present invention performs equally well or better than prior art approaches, since the RDBMS chooses a smallest grouping set from a previous level as input to a next level grouping set, and is not affected by the ordering of groupings in the query. As the data changes, the optimal sequence will change, but will always be dynamically chosen.

(2) The present invention translates super groups into execution form during the last phase of compilation, and no query rewrite is required. This means there is little impact to the optimizer during the query rewrite and access path selection phases. Furthermore, bind time storage requirements are minimized and a shorter bind time is expected, especially for complex groupings.

(3) The present invention maintains the query in its original form (instead of rewriting it during the early optimizer phases into complex table expressions). This simplifies the process of recognizing and exploiting summary tables, assuming they can be used for the query.

(4) Implementation of the present invention is straightforward with no special case logic required.

(5) Workfiles created during processing do not need to carry values (0 or 1) for each grouping set column to indicate whether it is a subtotal or total (i.e. the GROUPING function value), since grouping sets are not mixed (applies to alternative 1 only below).

The potential disadvantage is that more workfiles are generated, but the workfiles are smaller and the total size in rows is the same.

Implementation of the Optimization Techniques

The improved optimization techniques of the present invention are described using a graph that shows the derivation relationships between grouping sets. Each box in the graph represents a grouping set, while arcs between boxes are used to represent derivation relationships. As seen before, the grouping sets are arranged in levels. Only derivations from one level apart are represented, since the smallest input is always from one level apart and any derivation that skips levels will not be as efficient.

Figure 4:
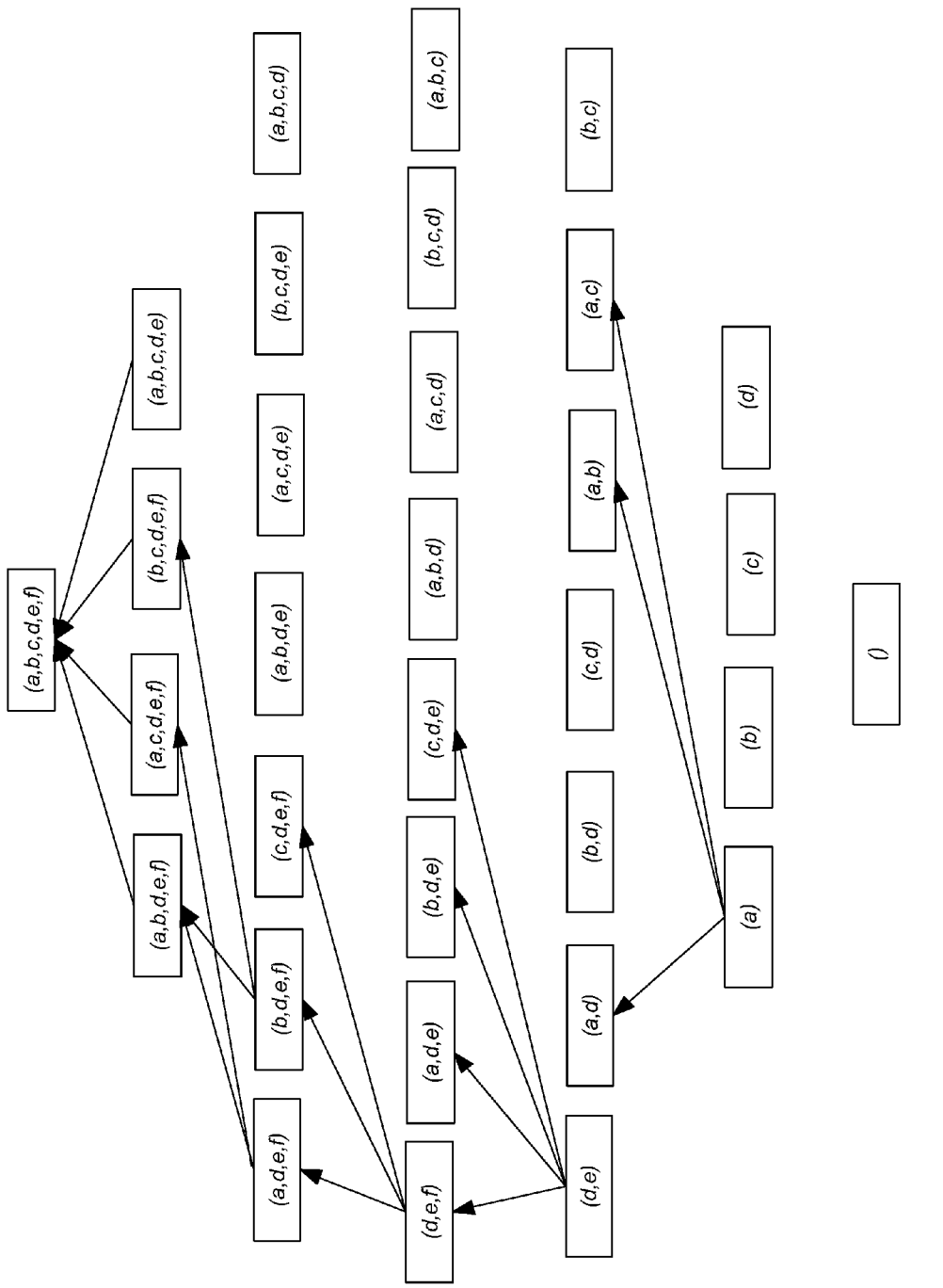
FIG. 4 is a block diagram illustrating how super groups are translated into grouping sets in a plurality of levels according to the preferred embodiment of the present invention.

Following is an example of the implementation of the optimization technique of the preferred embodiment of the present invention. Assume a query is comprised of the following:

SELECT . . . FROM . . . WHERE . . . GROUP BY CUBE (a, b, c), ROLLUP (d, e, f);

After compilation of the query, the super groups comprising the CUBE and ROLLUP operations are translated into the 32 grouping sets, which are shown as boxes in FIG. 4. Note that FIG. 4 shows only a subset of derivation relationships, represented by arrows, between boxes for the sake of clarity. A complete representation of the relationships in FIG. 4 would include arrows from every next level box to one or more previous level boxes where the corresponding previous level grouping set can be used to derive the corresponding next level grouping set.

The largest or base grouping set at the top of FIG. 4 is obtained from the tables specified in the FROM clause of the query. The grouping sets at the second level are obtained by performing GROUP BYs on the base grouping set; the grouping sets in the third level are obtained by performing GROUP BYs on the grouping sets at the second level; etc.

Note that in some cases, a grouping set can be obtained from more than one predecessor. For example, (b, d, e, f) at the second level of FIG. 4 can be obtained from either (a, b, d, e, f) or (b, c, d, e, f) at the first level of FIG. 4. At runtime, the RDBMS dynamically determines which grouping set to use based upon the sizes of these grouping sets. Thus, to obtain (b, d, e, f), the RDBMS chooses the smaller of (a, b, d, e, f) and (b, c, d, e, f). This process is repeated at each level in FIG. 4.

After the query is processed by a compiler of the RDBMS, a parse tree and other data structures resulting therefrom are passed to an execution structure generation function of the RDBMS. The execution structure generation function of the RDBMS translates the super groups found in the parse tree into equivalent grouping sets, for example, as shown in FIG. 4. Then, the RDBMS builds a super group structure that is similar to the hierarchy in FIG. 4 for use in optimizing the execution of the super groups.

The following describes more detailed processing steps for the above example.

Compilation/Bind Time

Figure 5:
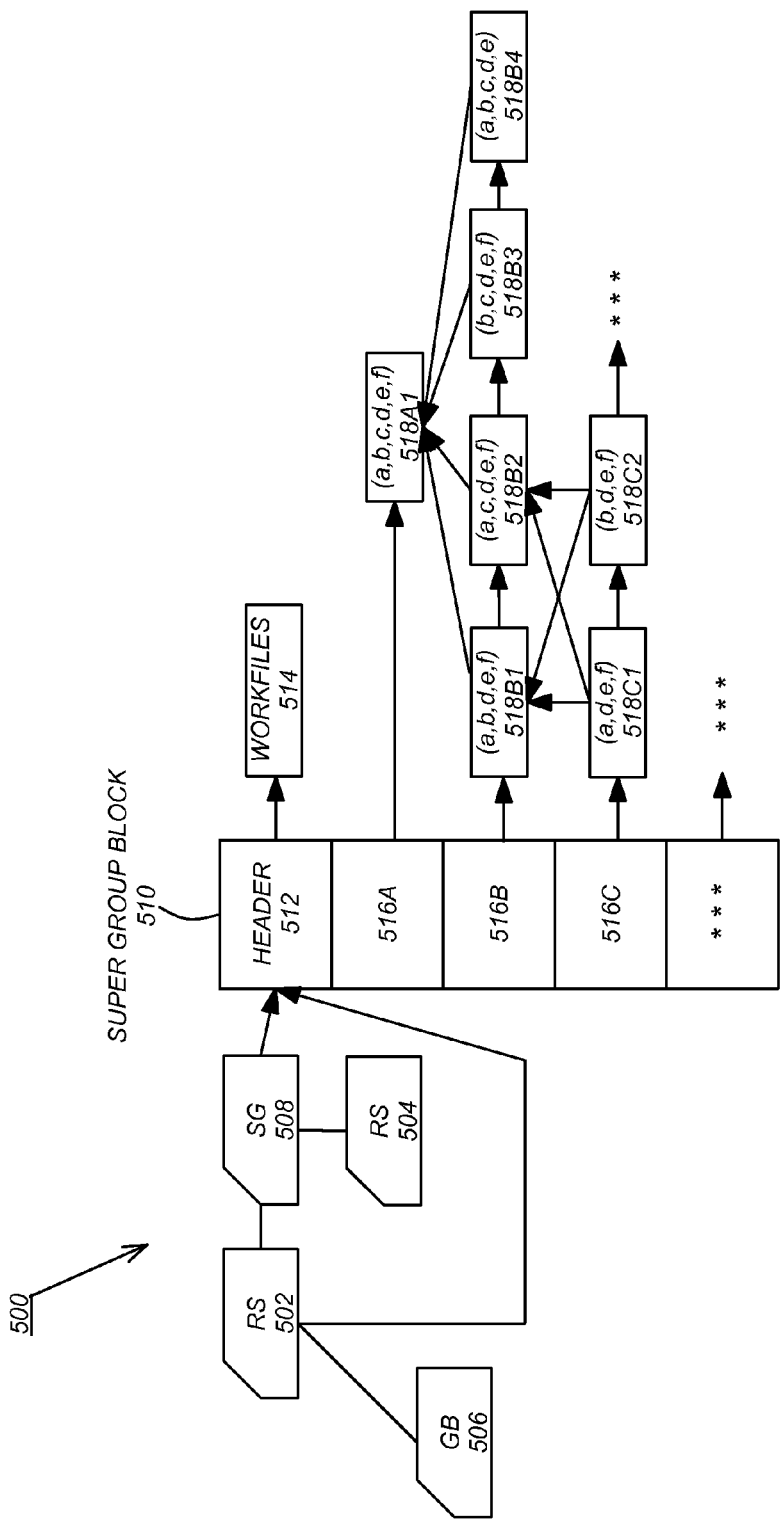
FIG. 5 is a block diagram illustrating a query execution plan for an exemplary query according to the preferred embodiment of the present invention.

A query execution plan (QEP) 500 for the example query is shown in FIG. 5, wherein the QEP 500 includes two runtime structures (RS) 502, 504 for performing SELECT statements, a GROUP BY (GB) operation 506, a super group (SG) operation 508, and a Super Group Block 510. The Super Group Block 510 includes a Header 512 having one or more pointers to one or more workfiles 514 and an array of pointers 516A, 516B, 516C to linked lists of Super Group Elements 518A1, 518B1, 518B2, 518B3, 518B4, 518C1, 518C2 representing grouping sets for different levels.

The execution structure generation function of the RDBMS has the primary responsibility for translating the super groups into execution form. The following bullets summarize the required steps.

(1) When a GB operation 506 with one or more SG operations 508 is encountered, the RDBMS will construct the Super Group Block 510 in the QEP. The SG operation 508 in such a situation includes an implicit UNION ALL operation.

(2) The RDBMS translates the GROUPING SETS, CUBE and/or ROLLUP operations associated with the GB operation 506 into equivalent grouping sets.

(3) If a combination of grouping sets or super groups has been specified, the RDBMS will "multiply" the combination together to determine an equivalent result in terms of grouping sets. In the example, the result of multiplying the CUBE and ROLLUP is 32 grouping sets. The grouping set with the maximum number of grouping columns is the base grouping set. If no GROUPING SETS, CUBE or ROLLUP are involved, the base grouping set includes all the columns in the grouping sets.

(4) The RDBMS constructs the Super Group Block 510 and attaches it to the SG operation 508 in the QEP:

(a) The RDBMS allocates and initializes the Super Group Block 510. The Header 512 includes a pointer to workfiles 514. An array of pointers 516A, 516B, 516C resides in the Super Group Block 510, wherein each pointer 516A, 516B, 516C points to a linked list of Super Group Elements 518A1, 518B1, 518B2, 518B3, 518B4, 518C1, 518C2 representing grouping sets for a particular level. The number of pointers 516A, 516B, 516C in the array corresponds to the number of columns in a base grouping set. In the example, there would be 6 entries in the array (although only 4 entries are shown in FIG. 5), because there are 6 grouping columns in the base grouping set (a, b, c, d, e, f), as shown in FIG. 4.

Each array pointer 516A, 516B, 516C is an anchor for a series of Super Group Elements 518A1, 518B1, 518B2, 518B3, 518B4, 518C1, 518C2 representing grouping sets with the same number of grouping columns. In the example, the first array pointer 516A is an anchor for Super Group Elements 518A1 representing grouping sets with 6 grouping columns; the second array pointer 516B is an anchor for Super Group Elements 518B1, 518B2, 518B3, 518B4 representing grouping sets with 5 grouping columns; etc.

At least one Super Group Element 518A1, 518B1, 518B2, 518B3, 518B4, 518C1, 518C2 is allocated for each of the grouping sets, wherein the Super Group Element 518A1, 518B1, 518B2, 518B3, 518B4, 518C1, 518C2 contains the information for a given grouping set and a pointer to a next Super Group Element 518A1, 518B1, 518B2, 518B3, 518B4, 518C1, 518C2 in the series. Consequently, the Super Group Elements 518A1, 518B1, 518B2, 518B3, 518B4, 518C1, 518C2 comprises elements of a linked list. For example, all of the Super Group Elements 518C1, 518C2 representing grouping sets with exactly 4 grouping columns are linked together in a linked list.

(b) The RDBMS assigns each grouping set to its corresponding link list according to the number of grouping columns in the grouping set.

(c) Each Super Group Element 518A1, 518B1, 518B2, 518B3, 518B4, 518C1, 518C2 includes one or more pointers to one or more Super Group Elements 518A1, 518B1, 518B2, 518B3, 518B4, 518C1, 518C2 on a previous (higher) level, to indicate that the Super Group Elements 518A1, 518B1, 518B2, 518B3, 518B4, 518C1, 518C2 on a previous (higher) level can be used as an input source to generate the grouping set of the Super Group Element 518A1, 518B1, 518B2, 518B3, 518B4, 518C1, 518C2. In the example, grouping set (a, d, e, f) can be generated from either grouping set (a, b, d, e, f) or grouping set (a, c, d, e, f). Therefore, the Super Group Element 518C1 for grouping set (a, d, e, f) has two pointers pointing to the Super Group Elements 518B1, 518B2 for grouping sets (a, b, d, e, f) and (a, c, d, e, f).

Alternatively, to reduce the pointers used, an implementation can use a bit map to encode each grouping set. Each bit in the bit map corresponds to a column in the base grouping set. For a grouping set, if a column presents in the grouping set, then its corresponding bit in the bit map is 1, otherwise it's 0. An explicit pointer for the derivation relationship can be replaced by checking that a bit map is a subset of another bit map at the previous level. An iteration through the Super Group Elements at the previous level can find all the input candidates for a Super Group Element.

(d) The information to identify the missing columns in the grouping set is saved in the Super Group Element 518A1, 518B1, 518B2, 518B3, 518B4, 518C1, 518C2. It can be 0's and 1's (1 for the missing column) or bit strings. This information can also be used to support the scalar GROUPING function at runtime.

(e) For each grouping set, the input to sort for the GROUP BY and aggregations contains the same number of elements. For a column of the base grouping set that is not a column of the current grouping set, the input points to a NULL value, so that the column will contain a NULL value in the workfile 514 of the GROUP BY sort. For example, column "c" will point to a NULL in the grouping set (a, b, d, e, f). Moreover, the number of sort key fields might be different for each sort, since the sort keys are the grouping expressions for the current grouping set.

(f) Also, if there is an aggregate function specified for a column in the SELECT list of the query, there will also be an entry to represent the aggregate function's result. The GROUPING function result entry will point to an integer value of 0, if the argument of GROUPING function appears in the grouping column of the current grouping set. The GROUPING function result entry will point to an integer value of 1, if the argument of GROUPING function does not appear in the grouping column of the current grouping set.

Execution Time (1) During execution, when a SG operation 508 is encountered, the RDBMS traverses the Super Group Structure 510, and performs a GROUP BY sort for each Super Group Element 518A1, 518B1, 518B2, 518B3, 518B4, 518C1, 518C2 in the structure 510 on a level-by-level (top-to-bottom or previous-to-next) basis.

(2) The input for the Super Group Element 518A1 representing the base grouping set, i.e., grouping set (a, b, c, d, e, f) in the example, is obtained from RS 504 by the SG operation 508.

(3) The inputs for the Super Group Elements 518B1, 518B2, 518B3, 518B4, representing the second level grouping sets, i.e., grouping sets (a, b, d, e, f), (a, c, d, e, f), (b, c, d, e, f) and (a, b, c, d, e) in the example, are obtained from the base grouping set.

(4) For subsequent levels, the inputs for the Super Group Elements 518A1, 518B1, 518B2, 518B3, 518B4, 518C1, 518C2 representing next level grouping sets are obtained from previous level grouping sets. Each grouping set in a level may have more than one possible input and may have a different input than other grouping sets in the level. According to the present invention, the RDBMS determines the cardinalities of the input for each grouping set to select the input with lowest cardinality. Note that Super Group Element 518A1, 518B1, 518B2, 518B3, 518B4, 518C1, 518C2 may generate its own workfile as an output and the RDBMS may determine the cardinalities of these workfiles to determine which are to be selected as the inputs for the next level grouping sets.

(5) When the RDBMS finishes processing the SG operation 508, all results of the grouping sets in the Super Group Structure 510 should be generated.

(6) In the example, the RS operation 502 traverses the Super Group Elements 518A1, 518B1, 518B2, 518B3, 518B4, 518C1, 518C2 in the Super Group Block 510 and select the workfiles 514 accordingly. This is equivalent to an implicit UNION ALL operation.

(7) If system resources (e.g., the number of workfiles 514 generated) are an issue with this architecture, there are two alternatives to reduce the number of workfiles 514, as described below.

Alternative 1

(1) To minimize the workfiles 514 generated at a given point of time, the RDBMS can generate the base grouping set, i.e., grouping set (a, b, c, d, e, f) in the example, only when processing the SG operation 508.

(2) The other grouping sets can be generated on-demand at the time the RDBMS traverses the Super Group Block 510, i.e., only when executing the RS operation 502. This means that the RDBMS invokes sort to perform the GB operation 506 sort for a grouping set when it is required to fetch the next row from a grouping set that has not yet been generated.

(3) In this manner, the RDBMS can free up any workfile 514 which has been fetched and processed already and is no longer needed. For example, if the RDBMS is executing level "n" in the Super Group Block 510, the workfiles 514 in level "n−2" can be released, since the grouping sets of level "n" can only come from level "n−1."

Alternative 2

(1) Another approach is to collapse all the results from the grouping sets into a single workfile 514, i.e., a Super Group Workfile 514.

(2) The GROUP BY sort result is appended to the Super Group Workfile 514 when the GROUP BY sort is performed for each Super Group Element 518.

(3) The beginning and ending positions or record ids (RIDs) of the current grouping set are kept in the Super Group Element 518 for each grouping set appended to the Super Group Workfile.

(4) When generating the grouping sets on a next level, a sort operation has to fetch the data from the Super Group Workfile 514 according to the RIDs in the Super Group Element 518 chosen.

(5) When the RDBMS needs to fetch the data from a grouping set, it can also use the RIDs kept in the Super Group Element 518 to reposition and fetch the data from the Super Group Workfile 514.

Parallelism Support

Parallelism support for super groups is implemented in a manner similar to a GROUP BY sort, because the SG operation is, in essence, a plurality of GROUP BY sorts. The SG operation can be performed as either a consumer or producer task.

As a consumer task, the SG operation is performed at "consumer time" after the data is fetched. Alternatively, the SG operation may be pushed down to producer tasks, wherein each producer task performs its own SG operation against its own data, each producer task has its own Super Group Block, and the corresponding workfiles of each Super Group Block are merged together before a final GROUP BY and aggregation is performed.

Logic of the Preferred Embodiment

Figure 6:
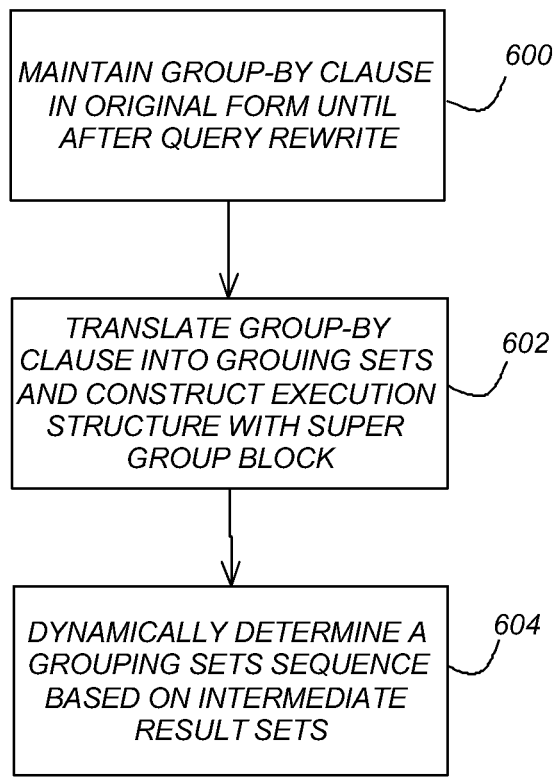
FIG. 6 is a flowchart illustrating a method of optimizing a query in a computer system, the query being performed by the computer system to retrieve data from a database stored on the computer system, according to the preferred embodiment of the present invention.

FIG. 6 is a flowchart illustrating a method of optimizing a query in a computer system, the query being performed by the computer system to retrieve data from a database stored on the computer system, according to the preferred embodiment of the present invention.

Block 600 represents the RDBMS, during compilation of the query, maintaining a GROUP BY clause with one or more GROUPING SETS, ROLLUP or CUBE operations in its original form until after query rewrite.

Block 602 represents the RDBMS, at a later stage of query compilation, translating the GROUP BY clause with one or more GROUPING SETS, ROLLUP or CUBE operations into equivalent grouping sets arranged into a plurality of levels having one or more grouping sets, and generating query execution plan 500 with a super group block 510.

Block 604 represents the RDBMS, at the query execution time, dynamically determining a grouping sets sequence for the GROUP BY clause with the GROUPING SETS, ROLLUP or CUBE operations based on intermediate grouping sets, in order to optimize the grouping sets sequence. This step includes: (1) performing GROUP BY for the base grouping set and then optimizing execution of the grouping sets sequence by selecting a smallest grouping set from a previous one of the levels as an input to a grouping set on a next one of the levels, and (2) performing a UNION ALL operation on the grouping sets.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program performing database queries with grouping and/or aggregation could benefit from the present invention.

In summary, the present invention discloses a method, apparatus, and article of manufacture for optimizing a query in a computer system, wherein the query is performed by the computer system to retrieve data from a database stored on the computer system. During compilation of the query, a GROUP BY clause with one or more GROUPING SETS, ROLLUP or CUBE operations is maintained in its original form until after query rewrite. The GROUP BY clause with the GROUPING SETS, ROLLUP or CUBE operations is then translated into a plurality of levels having one or more grouping sets. After compilation of the query, a grouping sets sequence is dynamically determined for the GROUP BY clause with the GROUPING SETS, ROLLUP or CUBE operations based on intermediate grouping sets, in order to optimize the grouping sets sequence. The execution of the grouping sets sequence is optimized by selecting a smallest grouping set from a previous one of the levels as an input to a grouping set on a next one of the levels. Finally, a UNION ALL operation is performed on the grouping sets.

The foregoing description of the preferred embodiment of the invention has been presented for the purposes of illustration and description. It is not intended to be exhaustive or to limit the invention to the precise form disclosed. Many modifications and variations are possible in light of the above teaching.

What is claimed is:

1. A method of performing a query in a computer system, the query being performed to retrieve data from a database stored on the computer system, the method comprising:
  (a) optimizing grouping operations during execution of the query in the computer system by:
    (1) constructing a Super Group Block when a GROUPBY operation with one or more super group operations is encountered in the query, wherein the super group operations comprise GROUPING SETS, ROLLUP and CUBE operations;
    (2) translating the GROUPBY operation with the super group operations into grouping sets arranged in a plurality of levels using the Super Group Block, wherein each of the grouping sets specifies one or more grouping expressions that are aggregated, each of the levels is comprised of one or more of the grouping sets, and all of the grouping sets in each of the levels have the same number of the grouping expressions, such that:
      (i) the Super Group Block has an array of pointers to a plurality of linked lists of Super Group Elements representing the grouping sets arranged in the plurality of levels, wherein the number of pointers in the array corresponds to the number of grouping expressions in the grouping sets in a base level, each pointer points to a particular one of the linked lists of Super Group Elements representing the grouping sets for a particular one of the levels, and at least one of the Super Group Elements is allocated for each of the grouping sets;
(ii) each of the Super Group Elements includes one or more pointers to one or more of the Super Group Elements on a previous one of the levels, to indicate that one or more of the grouping sets on the previous one of the levels can be used to derive the grouping set of the Super Group Element; and
(iii) each of the Super Group Elements includes one or more pointers to one or more workfiles created during processing of the Super Group Element;
(3) deriving the grouping sets on a level-by-level basis using the Super Group Elements of the Super Group Block and storing output from each of the Super GroupElements in the workfiles of the Super Group Elements, wherein the grouping sets in the base level are obtained from the database and the grouping sets in a next one of the levels are derived by selecting as an input a smallest one of the grouping sets in the previous one of the levels with which the grouping sets in the next one of the levels has a derivation relationship; and
(4) combining the derived grouping sets into an output for the query.

2. The method of claim 1, wherein the grouping expressions comprise grouping columns, and the grouping sets in the base level include all of the grouping columns in the grouping sets.

3. The method of claim 1, wherein the grouping sets in the next one of the levels are derived by performing grouping operations on the smallest one of the grouping sets in the previous one of the levels with which the grouping sets in the next one of the levels has a derivation relationship.

4. The method of claim 1, wherein the grouping sets in the next one of the levels can be derived from more than one of the grouping sets in the previous one of the levels.

5. The method of claim 1, wherein each of the grouping sets in the next one of the levels is derived from different ones of the grouping sets in the previous one of the levels.

6. The method of claim 1, wherein each pointer in the array is an anchor for a series of the Super Group Elements representing the grouping sets with the same number of grouping expressions.

7. The method of claim 6, wherein each of the Super Group Elements contains a pointer to a next one of the Super Group Elements in the series.

8. A computer-implemented apparatus for performing a query to retrieve data from a database, the apparatus comprising:
(a) a computer configured for optimizing grouping operations during execution of the query in the computer by:
(1) constructing a Super Group Block when a GROUPBY operation with one or more super group operations is encountered in the query, wherein the super group operations comprise GROUPING SETS, ROLLUP and CUBE operations;
(2) translating the GROUPBY operation with the super group operations into grouping sets arranged in a plurality of levels using the Super Group Block, wherein each of the grouping sets specifies one or more grouping expressions that are aggregated, each of the levels is comprised of one or more of the grouping sets, and all of the grouping sets in each of the levels have the same number of the grouping expressions, such that:

(i) the Super Group Block has an array of pointers to a plurality of linked lists of Super Group Elements representing the grouping sets arranged in the plurality of levels, wherein the number of pointers in the array corresponds to the number of grouping expressions in the grouping sets in a base level, each pointer points to a particular one of the linked lists of Super Group Elements representing the grouping sets for a particular one of the levels, and at least one of the Super Group Elements is allocated for each of the grouping sets; and
(ii) each of the Super Group Elements includes one or more pointers to one or more of the Super Group Elements on a previous one of the levels, to indicate that one or more of the grouping sets on the previous one of the levels can be used to derive the grouping set of the Super Group Element;
(iii) each of the Super Group Elements includes one or more pointers to one or more workfiles created during processing of the Super Group Element;
(3) deriving the grouping sets on a level-by-level basis using the Super Group Elements of the Super Group Block and storing output from each of the Super Group Elements in the workfiles of the Super Group Elements, wherein the grouping sets in the base level are obtained from the database and the grouping sets in a next one of the levels are derived by selecting as an input a smallest one of the grouping sets in the previous one of the levels with which the grouping sets in the next one of the levels has a derivation relationship; and
(4) combining the derived grouping sets into an output for the query.

9. The apparatus of claim 8, wherein the grouping expressions comprise grouping columns, and the grouping sets in the base level include all of the grouping columns in the grouping sets.

10. The apparatus of claim 8, wherein the grouping sets in the next one of the levels are derived by performing grouping operations on the smallest one of the grouping sets in the previous one of the levels with which the grouping sets in the next one of the levels has a derivation relationship.

11. The apparatus of claim 8, wherein the grouping sets in the next one of the levels can be derived from more than one of the grouping sets in the previous one of the levels.

12. The apparatus of claim 8, wherein each of the grouping sets in the next one of the levels is derived from different ones of the grouping sets in the previous one of the levels.

13. The apparatus of claim 8, wherein each pointer in the array is an anchor for a series of the Super Group Elements representing the grouping sets with the same number of grouping expressions.

14. The apparatus of claim 13, wherein each of the Super Group Elements contains a pointer to a next one of the Super Group Elements in the series.

15. A computer program product for performing a query in a computer system, the query being performed to retrieve data from a database stored on the computer system, the computer program product comprising:
(a) a non-transitory computer readable storage device having computer readable program code tangibly embodied thereon, the computer readable program code configured to optimize grouping operations during execution of the query in the computer system by:
(1) constructing a Super Group Block when a GROUPBY operation with one or more super group operations is encountered in the query, wherein the super group operations comprise GROUPING SETS, ROLLUP and CUBE operations;

(2) translating the GROUPBY operation with the super group operations into grouping sets arranged in a plurality of levels using the Super Group Block, wherein each of the grouping sets specifies one or more grouping expressions that are aggregated, each of the levels is comprised of one or more of the grouping sets, and all of the grouping sets in each of the levels have the same number of the grouping expressions, such that:

(i) the Super Group Block has an array of pointers to a plurality of linked lists of Super Group Elements representing the grouping sets arranged in the plurality of levels, wherein the number of pointers in the array corresponds to the number of grouping expressions in the grouping sets in a base level, each pointer points to a particular one of the linked lists of Super Group Elements representing the grouping sets for a particular one of the levels, and at least one of the Super Group Elements is allocated for each of the grouping sets; and (ii) each of the Super Group Elements includes one or more pointers to one or more of the Super Group Elements on a previous one of the levels, to indicate that one or more of the grouping sets on the previous one of the levels can be used to derive the grouping set of the Super Group Element;

(iii) each of the Super Group Elements includes one or more pointers to one or more workfiles created during processing of the Super Group Element;

(3) deriving the grouping sets on a level-by-level basis using the Super Group Elements of the Super Group Block and storing output from each of the Super Group Elements in the workfiles of the Super Group Elements, wherein the grouping sets in the base level are obtained from the database and the grouping sets in a next one of the levels are derived by selecting as an input a smallest one of the grouping sets in the previous one of the levels with which the grouping sets in the next one of the levels has a derivation relationship; and (4) combining the derived grouping sets into an output for the query.

16. The computer program product of claim 15, wherein the grouping expressions comprise grouping columns, and the grouping sets in the base level include all of the grouping columns in the grouping sets.

17. The computer program product of claim 15, wherein the grouping sets in the next one of the levels are derived by performing grouping operations on the smallest one of the grouping sets in the previous one of the levels with which the grouping sets in the next one of the levels has a derivation relationship.

18. The computer program product of claim 15, wherein the grouping sets in the next one of the levels can be derived from more than one of the grouping sets in the previous one of the levels.

19. The computer program product of claim 15, wherein each of the grouping sets in the next one of the levels is derived from different ones of the grouping sets in the previous one of the levels.

20. The computer program product of claim 15, wherein each pointer in the array is an anchor for a series of the Super Group Elements representing the grouping sets with the same number of grouping expressions.

21. The computer program product of claim 20, wherein each of the Super Group Elements contains a pointer to a next one of the Super Group Elements in the series.

* * * * *